Figures 1, 2, 3:
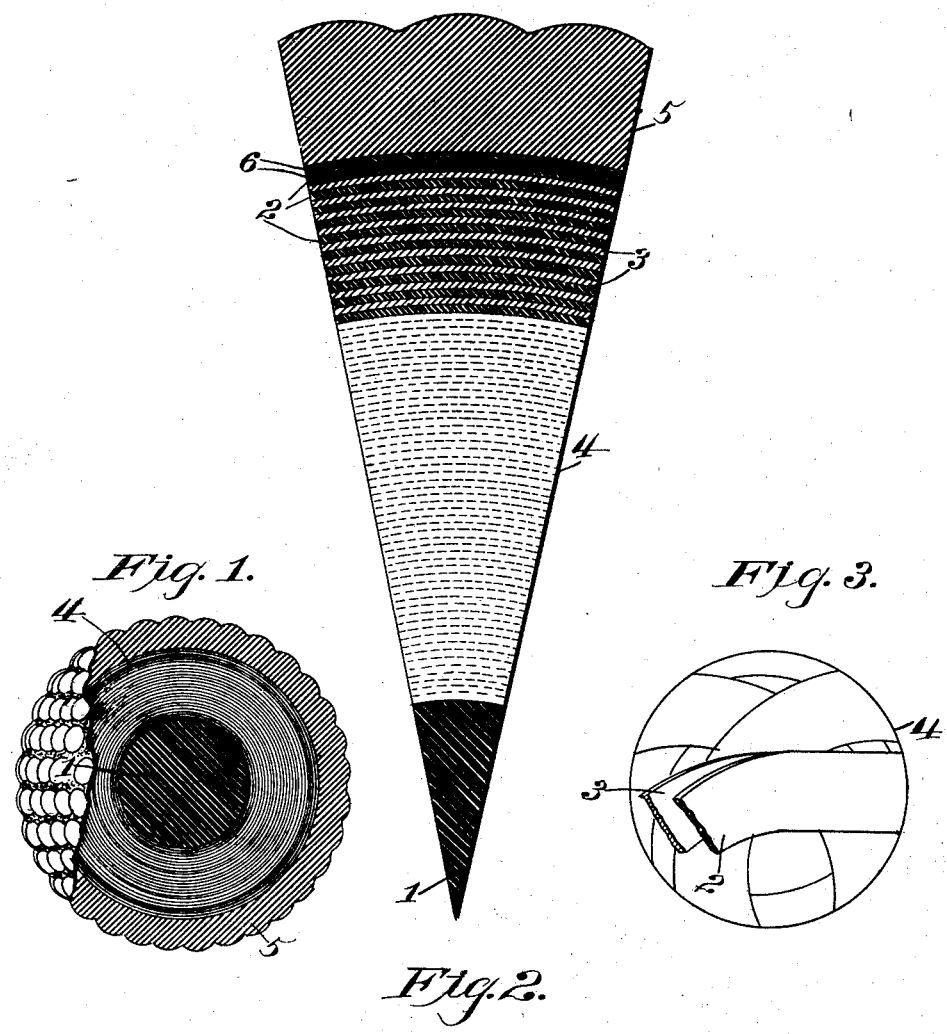

No. 737,773. PATENTED SEPT. 1, 1903.
F. H. RICHARDS.
PLAYING BALL.
APPLICATION FILED DEC. 4, 1902.
NO MODEL.

Witnesses:
Herbert J. Smith
O. C. Stickney

Inventor:
F. H. Richards

No. 737,773. Patented September 1, 1903.

UNITED STATES PATENT OFFICE.

FRANCIS H. RICHARDS, OF HARTFORD, CONNECTICUT.

PLAYING-BALL.

SPECIFICATION forming part of Letters Patent No. 737,773, dated September 1, 1903.

Application filed December 4, 1902. Serial No. 133,828. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention relates to playing-balls; and its objects are to increase the flying power and reduce the cost thereof.

In the accompanying drawings, Figure 1 is a part-sectional view of a golf-ball embodying my improvements. Fig. 2 is an enlarged segment of the ball. Fig. 3 illustrates the filling or body of the ball.

In the several views similar parts are designated by similar characters of reference.

For the center piece of the ball I employ a small sphere 1, preferably of hard springy plastic material, such as celluloid. Upon this center piece I wind simultaneously in miscellaneous directions strips 2 of raw rubber or caoutchouc and strips 3 of cured sheet-rubber layer over layer to form the filling 4 of the ball, and upon this filling I place a shell 5 of hard springy plastic material, preferably gutta-percha and preferably holding the filling under compression.

In winding the filling 2, which forms the principal part of the body of the ball in the illustrated construction, I preferably employ in connection with the raw-rubber strips or layers a thin sheeting of acid-cured rubber 2—that is, rubber which has been changed from the crude to a usable state by a well-known acid process as distinguished from the more common process of mixing raw rubber with sulfur and then subjecting the mixture to heat. Specimens of acid-cured rubber are the commercial "surgeon's rubber" or "dental dam." This contains little or no foreign dead mixture which would impair its strength or elasticity, and it is much stronger than rubber which is vulcanized by being first mixed with sulfur and then heated, and hence performs an important function in my improved ball, because it withstands great strain.

Preferably the strips 2 and 3 are wound coincidently, as illustrated at Fig. 3, although the layers of caoutchouc and cured rubber may be otherwise applied. Each layer or strip is wound under tension. Preferably the tension of the cured strip 3 is much greater than that of the raw strip 2, although this relation may be reversed. The latter is naturally adhesive and gummy, and hence serves to bind together the layers of relatively inadhesive cured rubber, whereby is produced a sphere which is tenacious throughout and of great value in a ball for golf and other games. Moreover, owing to the general packing action due to the longitudinal tension of both kinds of rubber strip, the gummy caoutchouc is caused to flow laterally to a sufficient extent to fill up all of the crannies caused by the overlapping of the windings, and hence the sphere is rendered not only highly tenacious, but also absolutely solid throughout, which is a feature of great importance. Again, the caoutchouc, by reason of its elasticity enhanced by its tension, contributes materially to the excellent quality of the ball. It is a relatively inexpensive material, and because of its use other economies are effected in the production of the ball. The outer windings, it will be understood, pack the inner layers in a most effectual manner. It will be perceived that owing to the solidity of a ball thus formed subsequent lateral flow of either rubber sheet or strip becomes impossible—that is, such flow as would occur at the unconfined edges of an ordinary plate of rubber when subjected to pressure—and hence any further distortion of the rubber when the ball is struck can occur only in direction longitudinally of the strips, and since this is already highly tensioned the ball exhibits phenomenal flying power. Moreover, the described ball of solid windings is so hard and so highly tensioned as not to be unduly affected by a light blow, rendering the ball also excellent for "putting." It will be understood that thin sheeting of acid-cured rubber may be employed, since this quality or kind of rubber stands very great stress without breaking.

In using the term "acid process" herein I mean to distinguish from that vulcanizing process which consists of mixing sulfur mechanically with rubber and then subjecting the mixture to heat, said acid process involving the surface treatment or immersion of the raw-rubber sheet in a suitable bath—as, for instance, in a bath consisting of a mixture of dichlorid of sulfur and carbon disulfid.

The highly-tensioned sheeting of each kind of rubber has not only the advantage of being extremely elastic and not only packs closely layer upon layer to form a solid ball, but it will also be seen that because of its thinness a great number of layers can be compacted within the allotted space, and since each layer is independently-tensioned a large amount of power is stored up on the ball. Again, by using approximately pure cured rubber and raw rubber in forming the body the golf-ball is rendered buoyant in water, so that if accidentally driven into a lake or stream it can be readily located and recovered.

The gutta-percha shell 3 may, if desired, be formed of hemispherical segments, which are preferably welded upon the filling 2 under heat and pressure. The filling is completed by winding on enough of the raw caoutchouc to form a complete adhesive envelop 6 for effectually binding the cover to the filling.

The center piece 1 may be made of other material within the scope of my present improvements, and my novel filling or body may be used with other covers than that illustrated. Other kinds of cured rubber may be used in connection with the caoutchouc. It will also be understood that acid-cured rubber, which has greater strength and elasticity than heat-cured rubber or vulcanite, may be used in connection with the latter in the manner herein described with reference to acid-cured and raw rubber, and the windings of heat-cured rubber may be under less tension or softer than the acid-cured rubber.

Since all of the features herein described may not be claimed in a single patent, some of them will be divided out and presented in separate applications.

Having thus described my invention, I claim—

1. In a playing-ball, a sphere consisting of windings of cured rubber and caoutchouc.

2. In a playing-ball, a sphere consisting of layers of cured rubber and caoutchouc in alternation, the cured rubber being in a tense condition.

3. In a playing-ball, a sphere consisting of numerous layers of tense cured rubber and tense caoutchouc.

4. In a playing-ball, a sphere consisting of numerous tense windings of cured rubber mingled with caoutchouc, the latter adhering to said cured rubber, so that the sphere is tenacious throughout.

5. In a playing-ball, a center piece; a sphere thereon consisting of numerous tense windings of cured-rubber strip mingled with tense windings of caoutchouc strip; the whole forming a solid mass, and the cured rubber adhering to the caoutchouc.

6. A playing-ball comprising a filling and a cover; said filling comprising a center piece and layers thereon of cured rubber and caoutchouc; the outermost of said layers consisting of caoutchouc, which adheres to said cover.

7. A playing-ball comprising a center piece, windings of both cured rubber and raw rubber, and a layer of hard, springy plastic material adhering to said raw rubber.

8. A playing-ball comprising a sphere of hard, springy plastic material, windings of cured rubber, and windings of raw rubber; said plastic material adhering to the raw rubber.

9. In a playing-ball, a sphere consisting of a hard center piece; numerous thin layers thereon of acid-cured rubber and caoutchouc in alternation, the cured rubber being in a tense condition; and a cover of gutta-percha.

10. A playing-ball comprising a center piece, and a sphere thereon consisting of numerous thin layers of tense acid-cured rubber and tense caoutchouc in alternation.

11. In a playing-ball, a sphere consisting of numerous tense windings of acid-cured rubber interspersed with caoutchouc, the latter adhering to said cured rubber, and filling the crannies made by the windings, so that the sphere is tenacious and solid throughout; and a cover of plastic material.

12. In a playing-ball, a center piece; numerous tense windings thereon of acid-cured rubber strip mingled with tense windings of caoutchouc strip; the whole forming a solid mass, and the cured rubber adhering to the caoutchouc; and a layer of gutta-percha.

13. A playing-ball comprising a filling, and a cover of plastic material holding the same under compression; said filling comprising a center piece and layers thereon of tense acid-cured rubber and tense caoutchouc; the outermost of said layers consisting of caoutchouc, which adheres to said cover.

14. A playing-ball comprising tense windings of both acid-cured rubber and raw rubber, and a gutta-percha layer adhering to said raw rubber.

15. A playing-ball comprising a sphere of celluloid, a sphere of gutta-percha, and a sphere consisting of numerous tense windings of acid-cured rubber mingled with layers of caoutchouc.

16. A playing-ball comprising distinct spheres of hard, springy plastic material, windings of acid-cured rubber, and windings of raw rubber; at least one of said spheres adhering to the raw rubber.

17. In a playing-ball, a sphere consisting of numerous thin layers of acid-cured rubber and caoutchouc in alternation, the cured rubber being in a tense condition; and a cover of gutta-percha.

18. In a playing-ball, a sphere consisting of numerous tense windings of acid-cured rubber mingled with windings of caoutchouc; and a cover of plastic material holding said sphere under compression.

19. In a playing-ball, a center piece; a sphere thereon consisting of numerous tense windings of acid-cured rubber strip mingled with tense windings of caoutchouc strip; the whole forming a solid mass, and the cured rubber adhering to the caoutchouc; and a cover of gutta-percha holding said sphere under compression.

20. A playing-ball comprising a center piece of celluloid; coincident tense windings thereon of acid-cured rubber and raw rubber, the latter adhering to the former and filling the crevices caused by the winding; and a cover.

21. A playing-ball comprising a filling and a cover of gutta-percha holding the same under compression; said filling comprising a center piece and layers thereon of acid-cured rubber and caoutchouc; the outermost of said layers consisting of caoutchouc, which adheres to said cover.

22. A playing-ball comprising a center piece, windings of both acid-cured rubber and raw rubber, and a gutta-percha layer adhering to said raw rubber.

23. A playing-ball comprising a sphere of gutta-percha and a sphere consisting of numerous tense windings of acid-cured rubber mingled with layers of caoutchouc.

24. In a playing-ball, a sphere formed of tense windings of inadhesive elastic material mingled with windings of adherent elastic material.

25. In a playing-ball, a sphere formed of tense windings of cured rubber mingled with windings of gummy elastic material.

26. A playing-ball comprising a sphere consisting of tense windings of elastic material, mingled with windings of elastic material having less tension.

Signed at Nos. 9 to 15 Murray street, New York, N. Y., this 3d day of December, 1902.

FRANCIS H. RICHARDS.

Witnesses:
B. C. STICKNEY,
JOHN O. SEIFERT.